(12) United States Patent
Coenraets

(10) Patent No.: US 11,965,354 B2
(45) Date of Patent: Apr. 23, 2024

(54) DEVICE FOR COVERING A SURFACE COMPRISING MEANS FOR LOCKING A COVER IN A GROOVE

(71) Applicant: BECOFLEX, Strepy-Bracquegnies (BE)

(72) Inventor: Benoît Coenraets, Strepy-Bracquegnies (BE)

(73) Assignee: Becoflex, Strepy-Bracquegnies (BE)

( * ) Notice: Subject to any disclaimer, the term of this patent is extended or adjusted under 35 U.S.C. 154(b) by 94 days.

(21) Appl. No.: 17/801,846

(22) PCT Filed: Feb. 19, 2021

(86) PCT No.: PCT/EP2021/054152
§ 371 (c)(1),
(2) Date: Aug. 24, 2022

(87) PCT Pub. No.: WO2021/170500
PCT Pub. Date: Sep. 2, 2021

(65) Prior Publication Data
US 2023/0124424 A1    Apr. 20, 2023

(30) Foreign Application Priority Data
Feb. 26, 2020   (BE) ................................. 2020/5124

(51) Int. Cl.
*E04H 4/10* (2006.01)
*A63C 19/12* (2006.01)
*B60J 7/06* (2006.01)

(52) U.S. Cl.
CPC .............. *E04H 4/101* (2013.01); *A63C 19/12* (2013.01); *B60J 7/068* (2013.01)

(58) Field of Classification Search
CPC .......... A63C 19/15; E04H 4/101; B60J 7/068
See application file for complete search history.

(56) References Cited

U.S. PATENT DOCUMENTS 4,001,900 A * 1/1977 Lamb ........................ E04H 4/10
                                                              4/498

FOREIGN PATENT DOCUMENTS

GB         2199741 A  *  7/1988  ............. E04H 4/101
WO     2010010152 A1     1/2010
                  (Continued)

OTHER PUBLICATIONS

English Translation of the Written Opinion of the ISA, (dated 2024).*
Int'l Search Report for PCT/EP2021/054152, dated May 20, 2021.

*Primary Examiner* — Erin Deery
(74) *Attorney, Agent, or Firm* — MaxGoLaw PLLC

(57) ABSTRACT

A device for covering a surface including a substantially rectangular cover (10) having first and second longitudinal edges each provided with a protruding convex bead (12) having a minimum diameter (d), two rails (6) including a groove, the opening (14) of which has a maximum width (Lo), a drum (2) that is able to move above the surface in order to deploy or retrieve the cover, an insertion system (16) for continuous insertion of the convex bead (12) into the groove. The convex head (12) of each longitudinal edge and the groove of the corresponding rail are configured such that, once inserted into the space (14e) by the insertion system, the convex bead occupying the space alone cannot be removed solely by the action of a force (F) applied parallel to the transverse axis (Y) in the direction of the surface to be covered.

14 Claims, 6 Drawing Sheets

(56) References Cited

FOREIGN PATENT DOCUMENTS

| WO | 2010054960 A1 | 5/2010 |
| WO | 2014064138 A1 | 5/2014 |
| WO | 2017162368 A1 | 9/2017 |

\* cited by examiner

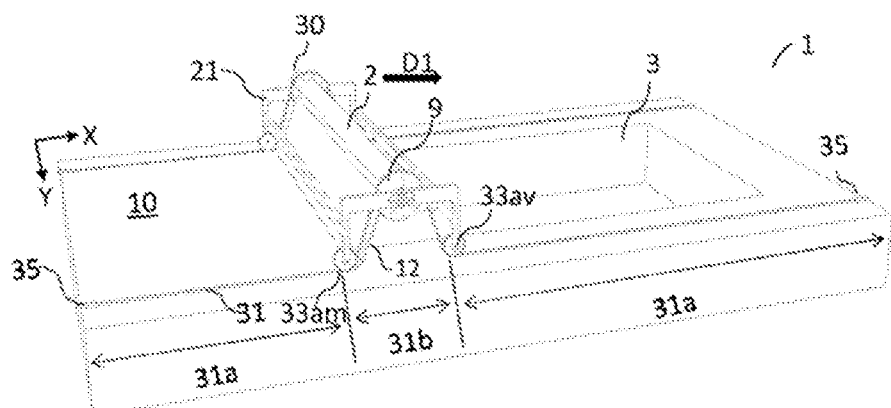
Fig.1(a)
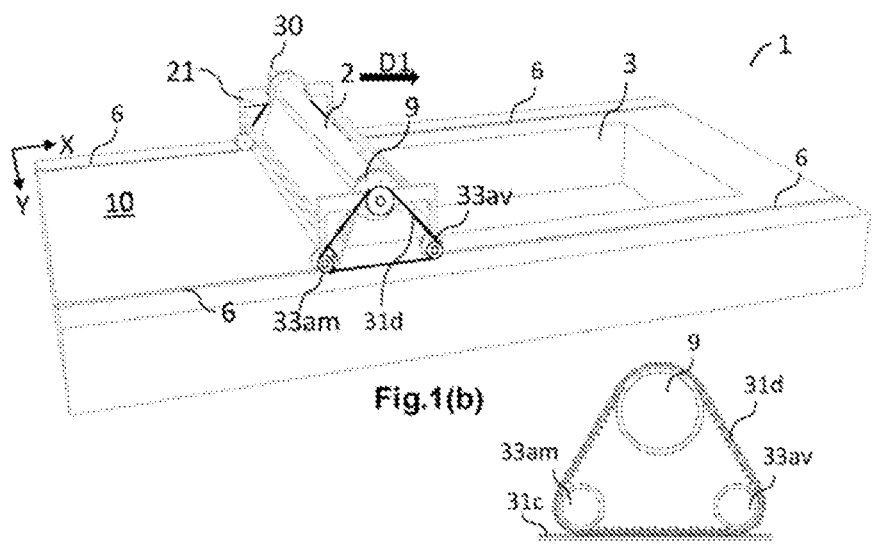
Fig.1(b)
Fig.1(c)

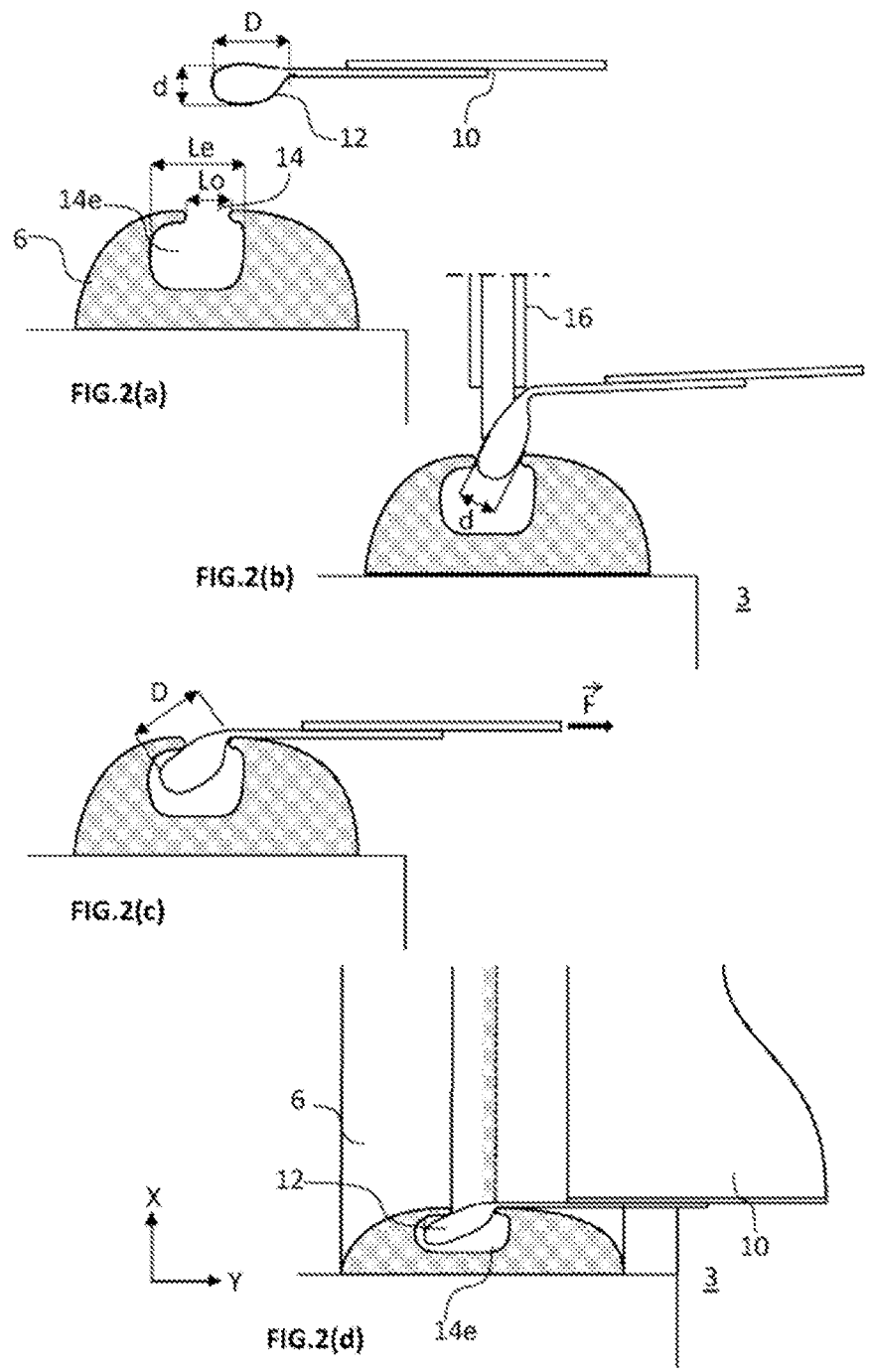

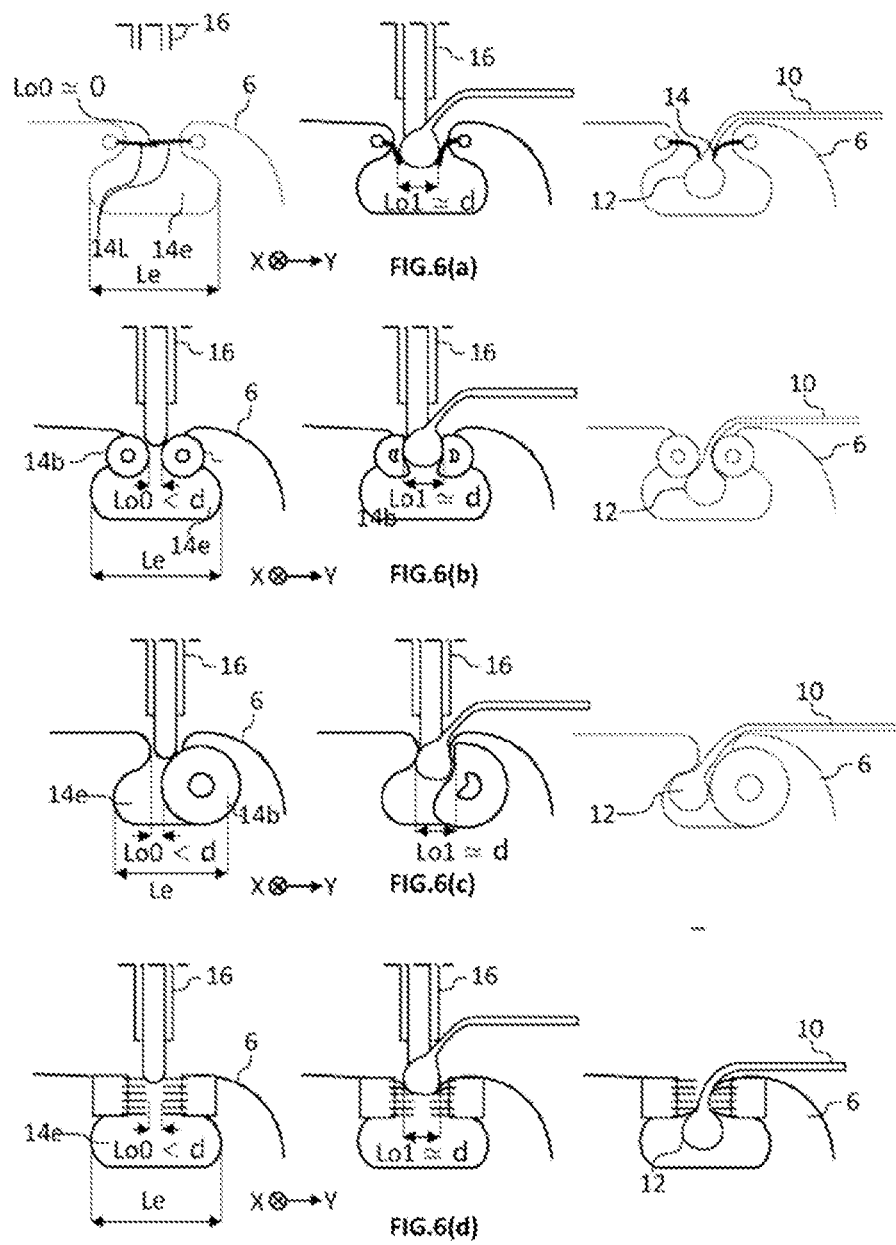

DEVICE FOR COVERING A SURFACE COMPRISING MEANS FOR LOCKING A COVER IN A GROOVE

FIELD OF THE INVENTION

The invention relates to a device for covering a surface which is simple to implement and which responds in an optimum manner to the requirements of the relevant application. In particular, the present invention relates to a device for covering in which the cover comprises longitudinal edges, each provided with a convex bead which is able to be anchored in a reversible manner to a groove of a rail by the action of an insertion system during the deployment of the cover on the surface. Once inserted in the groove, the protruding element is locked in an autonomous manner without requiring further external elements to carry out the locking.

TECHNOLOGICAL BACKGROUND

Covers are applied to surfaces for reasons which depend on the nature of these surfaces. Thus, in the case of a pool such as a swimming pool, the cover may prevent pollution due to leaves or animals, may save energy, water and reagents and may ensure or has to ensure the safety of people, in particular of children. In a pool for desalination or further treatments of a fluid, a cover makes it possible to prevent the dilution of the liquid due to rain, or excessive evaporation due to heat.

When it is a sports ground, such as an outdoor tennis court consisting of clay or grass, a cover enables the court to be protected against bad weather and, in particular, intermittent rain. Moreover, a vehicle body is covered, in particular, to ensure the stability of the load in the vacuum brought about by the displacement of the vehicle, and to protect it against bad weather. Covers are also used as blinds for greenhouses, conservatories or vehicle windows in order to avoid any overheating on the inside and as sun protection for terrace awnings.

In all of the specific cases, generally an economical device for covering is sought, said device for covering permitting a simple, reliable, reproducible and rapid covering and uncovering, requiring minimum human intervention and, above all, having a lifespan which is as long as possible. Numerous devices for covering a surface have been developed, ranging from basic models to the most sophisticated. For example, a first completely basic device which is used in the case of a swimming pool comprises an inflatable or non-inflatable cover which is unwound, extended and fixed manually to the edges of the swimming pool. This type of device is illustrated, for example, in the documents U.S. Pat. No. 6,691,334, GB2379163 and FR2652373. It is clear that, taking into account the handling and storage, only swimming pools of quite small size are relevant here.

Many devices use a rotating drum to wind up and store the cover when the surface is uncovered. The devices for covering a surface using a rotating drum may be classified into two categories.

(a) Devices comprising a drum fixed to one of the transverse ends of the surface to be protected. The cover is deployed by traction, by being unwound from the drum, and is dragged along the surface during its deployment and during its removal. This generates significant friction which increases the force required for the deployment and removal of the cover, and accelerates the wear of the cover. Automatic devices for covering are illustrated, in particular, in the following documents: U.S. Pat. No. 3,574,979, GB2199741, US2005/0097834, CA2115113, US2001/0023506, U.S. Pat. No. 5,930,848, US400190.

(b) Devices in which the motorized drum is mounted on a mechanism for longitudinal translation. This displaces the drum over the surface to be covered, which literally makes it possible to "place" the cover on the surface during its deployment, by unwinding the cover simultaneously from the drum during its longitudinal displacement, and then lifting it during its removal, by winding it simultaneously onto the drum. The cover thus does not slide on the surface, either during its deployment or during its removal. Examples of automatic devices of this type are disclosed, for example, in the following documents: WO2005/026473, FR2900951, DE2257231, FR2893651, FR2789425, FR2743502, EP1719858.

The present invention relates to the devices (b), in which the motorized drum is mounted on a mechanism for longitudinal translation, for the advantages which it has relative to the devices (a) comprising a drum fixed to a transverse end.

In the present application, the terms "longitudinal" and "transverse" and the derivatives thereof refer respectively to the direction of displacement of the drum and to the direction of the axis of revolution thereof.

In many applications, it is advantageous to lock the longitudinal edges of the cover as it is deployed. This is particularly important in the case of swimming pools since this makes it possible to avoid the situation where the people handling the cover are pushed into the water through a space between the longitudinal edge of the cover and the stone edge of the swimming pool. Moreover, sealing the peripheral contact zone between the cover and the longitudinal edges of the surface may prevent the introduction into the swimming pool of dirt, dead leaves and twigs, in addition to small animals such as insects, mice or snakes. This also opens up the possibility of pressurizing the volume of air located between the surface of the water and the lower surface of the cover, in order to inflate said cover. More sophisticated devices have been proposed, making it possible to fix in a reversible manner the longitudinal edges of the cover during its deployment, such as in the document FR2803769 which provides a system for fixing the longitudinal edges of the cover, consisting of grille sections which rise up and then fold back section-by-section on said longitudinal edges of the cover, maintaining these edges inside a channel as the cover is unwound. In this design, the longitudinal edges of the cover are pinched without being locked, which achieves a reduced level of safety, in particular in the case of swimming pools.

An advantageous system making it possible to fix the longitudinal edges of the cover during its deployment and simultaneously to exert a transverse traction force thereon in order to stretch it perfectly has been disclosed in WO2010/010152, WO2010054960 and in WO2014064138. In these devices, the longitudinal edges of the cover are provided with a rod or continuous protruding element which is introduced into the opening orientated toward the top of a rail in the form of a profile of "U-shaped" section with one or two flanges partially closing said opening. Since the protruding element slides below a flange and is held in this position by suitable fixing means, this makes it possible to fix the longitudinal edges of the cover securely.

The locking systems disclosed in WO2010010152 and WO2010054960 comprise:

(a) two rails extending along longitudinal sides and on either side of the surface to be covered. The rails consist of a profile having an opening toward the exterior (i.e. orientated away from the surface to be covered) on one of the faces thereof and comprising one or two flanges partially closing said opening on either side (if there is only one flange it is located on the side adjacent to the surface to be covered);

(b) the longitudinal edges of the cover each comprise at least one continuous protruding element, having a substantially "T-shaped" profile, provided over its entire length with a band fixed to at least one face of the cover;

(c) engagement means permitting said continuous protruding element to be engaged in the opening formed by the flange or the flanges of the rail and sliding it below one of the flanges; the substantially "T-shaped" profile of the protruding element disclosed in WO2010010152 is locked autonomously in the opening of the rail. In the device disclosed in WO2010054960 the protruding element is locked by the introduction of a flexible belt in the opening of the rail substantially simultaneously with the protruding element, which is locked in the rail by the presence of the flexible belt, which is also used to displace the carriage supporting the drum.

Such locking systems make it possible to slide the continuous protruding element into the opening of the rail and to secure it therein either autonomously or by introducing therein a flexible belt substantially simultaneously, thus bringing about the continuous fixing in said rail of the corresponding longitudinal edge of the cover and thereby holding the cover above the surface to be covered, even in the case of very high mechanical stresses due, for example, to a difference in pressure (i.e. overpressure or negative pressure) between the two surfaces of the cover, or the weight of the cover. In the case of swimming pools, it provides safety in the event of access to the cover (whether authorized or not). The strength of the locking system may easily reach a range of 5 to 10 kN/m (500 to 1000 kg/m) which is sufficient for many applications. Depending on the materials used, very high locking strengths may be achieved.

The substantially "T-shaped" profile, however, has to be manufactured in a polymer material which is sufficiently flexible to permit the cover to be wound and unwound around the drum and sufficiently strong to resist the tension applied by the deployed cover. Moreover, the coupling of such a profile to the corresponding longitudinal edge of the cover remains a challenge.

In order to simplify the fixing of the protruding elements to the longitudinal edges of the cover, WO2014064138 discloses a protruding element in the form of a bead, formed by a base cylinder having a convex geometry, preferably substantially circular or elliptical. Such a bead may comprise a core which is more or less rigid according to the applications, and which is encased in a fabric which may be easily coupled to a longitudinal edge of the cover by stitching, adhesive bonding or welding. A bead having a base of convex geometry is described here as a "convex bead", defined as a bead having a base defined in section by a closed perimeter which any straight line may traverse no more than twice. A circle, an ellipse, a triangle, square, pentagon, hexagon or other regular polygons are examples of convex geometries. A "T-shaped" profile or "H-shaped" profile does not define a convex geometry.

The locking to the opening of a rail of such a convex bead disclosed in WO2014064138, however, requires the substantially simultaneous introduction of a flexible belt in the opening of the rail. More specifically, the synchronization of the insertion of the bead and a flexible belt in the opening of the rail is not necessarily simple and requires the use of a specific insertion shoe.

It might be interesting to have a cover provided with convex beads which are simple to fix to the cover, the mechanical properties thereof being able to be changed easily as a function of the core used for the production thereof, and an autonomous locking system which enables such beads to be locked to a rail without having to introduce a belt simultaneously into the opening of the corresponding rails. The present invention proposes a cover comprising along its longitudinal edges a protruding element in the shape of a convex bead which is locked autonomously and reversibly in a groove provided in a rail, by the action of an insertion system. The device of the present invention permits the secure and reversible locking of the longitudinal edges of the cover in the rails during the deployment of the cover and the unlocking thereof during its removal, without requiring the use of flexible belts to complete the locking operation. This permits greater freedom in the choice of the translation mechanism of the carriage supporting the drum.

SUMMARY OF THE INVENTION

The invention is as defined in the main claim and preferred variants are defined in the dependent claims. The present invention comprises, in particular, a device for covering a surface encompassed in a rectangle, having lengths extending parallel to a longitudinal axis (X) and having widths extending parallel to a transverse axis (Y) perpendicular to the longitudinal axis (X), the device comprising:

a substantially rectangular cover having dimensions equal to those of the rectangle and having two longitudinal edges opposing one another and two transverse edges opposing one another, each longitudinal edge being provided with a protruding element extending along said each longitudinal edge in which the protruding element of each longitudinal edge defines a profile in section, perpendicular to the corresponding longitudinal edge, having a minimum diameter (d), two rails placed on either side of said surface parallel to the longitudinal axis (X), each rail consisting of a profile having an opening on one of its faces and orientated away from the surface to be covered, the opening providing access to a space in the rail, defining with the opening a groove extending along the length of each rail, a drum having a radius (R) mounted in rotation so as to be capable of winding up and unwinding the cover, said drum being mounted on a mechanism for longitudinal translation, permitting the longitudinal translation of the drum along the two rails in a first direction parallel to the longitudinal axis (X) bringing about the unwinding of the cover and its deployment over the surface to be covered, and in a second direction parallel to the longitudinal axis (X) bringing about the winding up of the cover and its removal from said surface, a deflection pulley provided on each side of the surface to be covered, making it possible to guide and position said protruding element of each longitudinal edge of the cover relative to the opening of the corresponding rail during the translation in the first direction of the drum bringing about the unwinding of the cover, a system for the continuous insertion of the protruding element of the longitudinal edges of the cover through the opening and into the space of said rails, wherein in a section perpendicular to each longitudinal edge of the cover, the corresponding protruding element defines a convex geometry, i.e. a planar geometry defined by a closed perimeter which any straight line may not pass through more than twice, in a cross section perpendicular to the longitudinal axis (X), the opening of the groove has a maximum width (Lo) and the space has a maximum width (Le) greater than the maximum width (Lo) of the opening (Lo<Le), where the maximum widths (Lo, Le) are measured parallel to the transverse axis (Y) and in that the protruding element of each longitudinal edge and the groove of the corresponding rail are configured such that, once inserted into the space by the insertion system, the protruding element occupying the space alone cannot be removed solely by the action of a force (F) applied parallel to the transverse axis (Y) in the direction of the surface to be covered.

In a first variant of the invention, the minimum diameter (d) of the protruding element is less than the maximum width (Lo) of the opening (d<Lo), and the protruding element has a maximum diameter (D) greater than the maximum width (Lo) of the opening (Lo<D).

The insertion system is configured to orientate the protruding element through the opening of the corresponding rail, having a diameter of between d and D and less than Lo. The protruding element changes orientation once the protruding element is located in the space.

In a further variant of the invention, the protruding element of each longitudinal edge is compressible such that in a resting configuration, the minimum diameter (d) is equal to d0 which is between the maximum widths (Lo, Le) of the opening and the space of the corresponding rail (Lo<d0<Le), and in a compressed configuration, the minimum diameter (d1) is equal to d1 which is less than or equal to the maximum width (Lo) of the opening of the corresponding rail (d1≤Lo).

The insertion system makes it possible to compress the protruding element into its compressed configuration during its insertion through the opening of the corresponding rail. The protruding element recovers its resting configuration once the protruding element is located in the space.

In a further variant of the invention, the protruding element of each longitudinal edge is a cable in the form of consecutive turns forming a helical spring, the axis thereof being parallel to the corresponding longitudinal edge of the cover, wherein the turns are defined such that in a resting configuration, the minimum diameter (d), measured parallel to the transverse axis (Y) of each turn at rest, is equal to d0 which is between the maximum widths (Lo, Le) of the opening and the space of the corresponding rail (Lo<d0<Le), and in a deformed configuration, the angle formed by the deformed turns with the longitudinal axis (X) is changed such that the minimum diameter (d1) measured in a plane perpendicular to the longitudinal axis (X) of each deformed turn is less than or equal to the maximum width (Lo) of the opening of the corresponding rail (d1≤Lo).

The insertion system makes it possible to deform locally the turns in their deformed configuration when inserted through the opening of the corresponding rail. The turns recover their resting configuration once they are located in the space.

In an alternative series of variants, the maximum width (Lo) of the opening may vary between a resting configuration in which the maximum width (Lo) of the opening is equal to Lo0 which is less than the minimum diameter (d) of the protruding element (Lo0<d), and an insertion configuration in which the maximum width (Lo) of the opening is equal to Lo1 which is greater than or equal to the minimum diameter (d) of the protruding element (d≤Lo1).

The insertion system is configured to apply a force, permitting the opening to be brought into its insertion configuration during the insertion of the protruding element through the opening of the corresponding rail, the opening returning to its resting configuration once the protruding element is located in the space.

In a first variant of this series, the opening comprises a first lip opposing a second lip. The first and/or second lip is provided with a flexible thin strip orientated toward the other opposing lip. The thin strip(s) define(s) at rest the opening of maximum width (Lo0) of the resting configuration and, subjected to a force perpendicular to the longitudinal axis orientated toward the space, flex and thus define the opening of maximum width (Lo1) of the insertion configuration.

In a further variant of this series, the opening comprises a first lip opposing a second lip, the first and/or second lip being provided with a flexible roll. The flexible roll(s) define(s) at rest the opening of maximum width (Lo0) of the resting configuration and, subjected to a force perpendicular to the plane (X, Y), are crushed and thus define the opening of maximum width (Lo1) of the insertion configuration.

In a further variant of this series, the space contains a flexible roll. The flexible roll at rest partially obstructs the opening, thus defining the maximum width (Lo0) of the resting configuration and, subjected to a force perpendicular to the plane (X, Y), is crushed and thus defines the opening of maximum width (Lo1) of the insertion configuration.

In a final variant of this series, the opening comprises a first lip opposing a second lip, the first and/or second lip being provided with a brush comprising bristles extending toward the opposing lip and partially or completely closing the opening. The bristles are sufficiently flexible to flex and thus permit the introduction of the protruding element through the opening and are sufficiently rigid to retain the protruding element when it is housed in the space.

The translation mechanism preferably comprises a carriage mounted on the rails and transversely overhanging the surface to be covered and supporting the drum, comprising at each of its ends:

a drive wheel, the axis of rotation thereof being parallel to that of said drum;

at least one downstream roller and one upstream roller resting on the rails or on a surface adjacent to the rails, and permitting the longitudinal translation of the carriage, and the first roller being mounted downstream and the second roller being mounted upstream of the drive wheel in the first direction of displacement and forming therewith a triangle of which the drive wheel forms an apex.

In a first embodiment, the downstream roller and the upstream roller rest on the corresponding rail. The translation mechanism comprises two flexible belts which are fixed solely at each of their ends to the four corners of the surface to be covered and extend along the longitudinal edges of the surface to be covered in the following manner:

the flexible belts are arranged in a channel defined in the rails, extending separately and parallel to the corresponding groove in the lateral sections between a fixing point and the roller closest to said fixing point, the flexible belts cover the drive wheel in the central section between the two rollers without slipping.

In a second embodiment, the translation mechanism comprises:

two closed flexible belts forming a loop and comprising an inner face and an outer face separated from the inner face by a thickness of the belts, the inner and outer faces of each flexible belt each being notched, the inner surface of each flexible belt covering the upstream and downstream rollers and the drive wheel without slipping and two racks arranged along the longitudinal edges, separated and parallel to the opening of each rail, the outer surface of a portion of each of the flexible belts between the corresponding downstream roller and upstream roller meshing in the corresponding rack.

A device according to the present invention is particularly suitable for covering a surface selected from:

(a) a pool which is filled or not filled with a liquid such as a swimming pool, a jacuzzi, a pool for the retention, treatment or desalination of water;

(b) a sports ground such as a tennis court or cricket pitch;

(c) a vehicle body;

(d) a glazed surface such as a greenhouse, a conservatory or a window or door, (e) an opening in a wall, such as a window or a door.

The present invention also relates to a method for covering a surface by a cover, using a device for covering according to the present invention, in which:

(a) the drum is located at an upstream end of the surface to be covered, with a transverse edge of the cover being fixed to this upstream end of the surface and the remainder of the cover being wound around the drum, (b) advancing the drum in a first direction over the surface to be covered along the rails and thus unwinding from the drum the cover which is deployed on the surface portion upstream of the drum and, at the same time, guiding and holding the protruding element of each longitudinal edge of the cover relative to the opening of the corresponding rail as the drum advances, (c) introducing the protruding element into the space of the rail and thus locking the protruding element to the rail.

BRIEF DESCRIPTION OF THE FIGURES

These aspects and other aspects of the invention will be clarified in the detailed description of particular embodiments of the invention, reference being made to the drawings of the figures, in which:

FIG. 1 overall view in perspective of a surface with a drum in position such that only an upstream part of the surface is covered by a cover, (a) a first variant, (b) a second variant and (c) detail of the means of displacement of the variant of FIG. 1(b). The terms "upstream" and "downstream" are defined relative to the first longitudinal direction of translation of the drum permitting the deployment of the cover.

FIG. 2 views of a protruding element and the locking thereof in the groove of a rail (a) before insertion and locking, (b) during insertion of the protruding element in the opening of the groove, (c) protruding element locked in the groove of the rail, and (d) view in perspective of the locked protruding element of FIG. 2(c).

FIG. 6 four examples (a) to (d) of views of the steps of insertion and locking of the protruding element in the groove of a rail according to other variants of the invention in which the width (Lo) of the opening of the rail varies during the insertion of the protruding element.

DETAILED DESCRIPTION OF PARTICULAR EMBODIMENTS

Figures 3A, 3B, 3C:
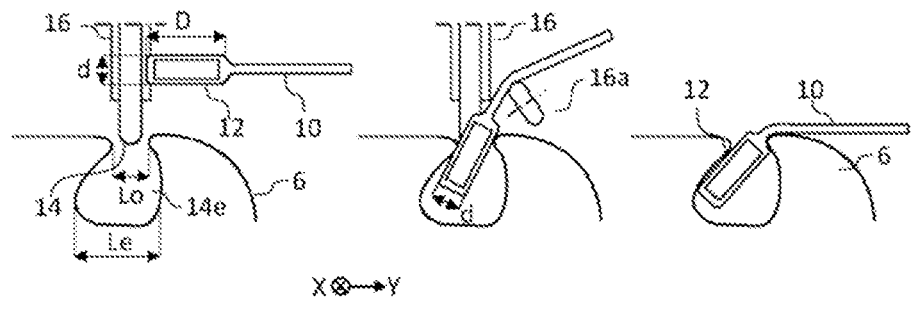
FIG. 3 (a) to (c) views of the steps of insertion and locking of the protruding element in the groove of a rail according to a first variant of the invention.

As shown in FIG. 1, the automatic device for covering (1) a surface (3) according to the invention comprises a cover (10) designed to protect said surface (3) encompassed in a rectangle having lengths extending parallel to a longitudinal axis (X) and having widths extending parallel to a transverse axis (Y) perpendicular to the longitudinal axis (X). The longitudinal (X) and transverse (Y) axes define a plane (X, Y). The cover (10) comprises an outer surface, opposing the surface to be covered (3) and an inner surface facing the surface to be covered. The outer surface is separated from the inner surface by a thickness of the cover. The device (1) makes it possible to cover, in particular, surfaces defined by the contour of a pool of water such as a swimming pool, jacuzzi, water treatment pool, waste water treatment plant, retention basin, desalination station, jacuzzi, etc. However, the invention could be implemented in any field requiring the covering of a surface, such as for example a tennis court consisting of clay or grass, a vehicle body, a glazed surface of a greenhouse, a window of a vehicle such as a train or bus, or a conservatory, etc. Generally, therefore, in the present application "surface" is understood to mean any zone delimited by a perimeter.

The device (1) comprises a substantially rectangular cover having dimensions equal to those of the rectangle describing the surface to be covered, and having two longitudinal edges opposing one another and two transverse edges opposing one another, each longitudinal edge being provided with a protruding element (12) extending along said each longitudinal edge in which the protruding element of each longitudinal edge defines a profile in section perpendicular to the corresponding longitudinal edge, having a minimum diameter (d).

The device comprises two rails (6) placed on either side of said surface (3) parallel to the longitudinal axis (X). Each rail consists of a profile having an opening (14) on one of its faces and orientated away from the surface to be covered.

The opening provides access to a space (14e) in the rail defining with the opening a groove extending along the length of each rail.

A drum (2) having a radius (R) is mounted in rotation, capable of winding up and unwinding the cover (10) fixed to the drum by its first transverse edge (upstream). The drum (2) is mounted on a mechanism for longitudinal translation, permitting the longitudinal translation of the drum along the two rails in a first direction parallel to the longitudinal axis (X), moving away from an upstream end of the surface and bringing about the unwinding of the cover and its deployment over the surface to be covered (3) and in a second direction parallel to the longitudinal axis (X) moving closer to the upstream end and bringing about the winding up of the cover and its removal from said surface (3).

The device (1) comprises a fixing system located at the upstream transverse end of the surface to be covered and making it possible to fix the second transverse edge of the cover to the upstream transverse end of the surface to be covered (3). Any type of fixing system which is known and suitable for the criteria of stresses, safety and, if required, sealing, according to the application may be used to this end. For example, the fixing system may comprise a plurality of straps fixed to the second transverse edge of the cover (10), said straps being provided, for example, with anchoring hooks which are fixed to the upstream transverse end of the contour delimiting the surface to be covered (3). Alternatively, it is possible to provide the second transverse edge of the cover with eyelets which are fixed to the upstream transverse end of the surface by means of a series of eyebolts, screws, a cable or any other means. A further variant is to trap the transverse edge of the cover below a plate having a length corresponding to the width of the cover, fixed to the surface by screws passing through the cover. These anchoring means and others which are too numerous to be mentioned, keep the upstream transverse end of the cover (10) immobile.

The translation mechanism permits the longitudinal translation of the drum (2) in a first direction parallel to the longitudinal axis (X) bringing about the unwinding of the cover by rotation in a first gyratory direction of the drum about its axis and the deployment of the cover over the surface to be covered (3), and in a second direction parallel to the longitudinal axis (X) bringing about the winding up of the cover and its removal from said surface (3) by rotation in a second gyratory direction of the drum.

The first direction of translation makes it possible for the drum to move away from the upstream transverse end of the surface, and to unwind the cover (10), to deploy it and cover the surface to be protected (3). The rotation in the first gyratory direction of the drum is made possible by the displacement of the drum which exerts a traction on the cover, the first transverse edge thereof being fixed to the upstream transverse end. The drum comprises a resilient means such as a spiral spring which is tensioned by the rotation of the drum in the first rotational direction.

The second direction of translation makes it possible for the drum to move closer to the upstream transverse end of the surface, and to wind up the cover (10), to remove it and uncover the surface (3). The rotation in the second direction of the drum is made possible by the relaxation of the resilient means such as a spiral spring which relaxes and brings about the rotation of the drum in the second rotational direction.

Figure 7A:
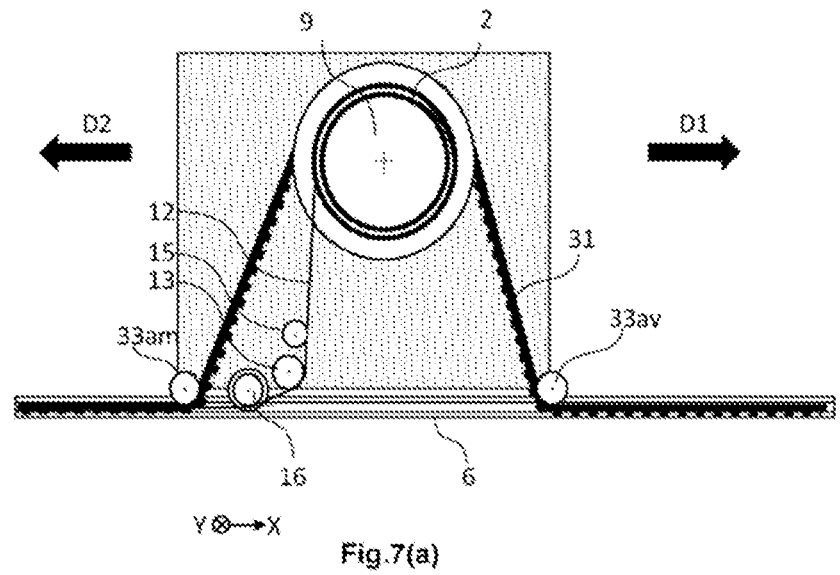
FIG. 7 mechanism for translation comprising a belt according to, on the one hand, (a) the variant of FIG. 1(a) and, on the other hand, (b) the variant of FIGS. 1(b) and (c).
Figure 7B:
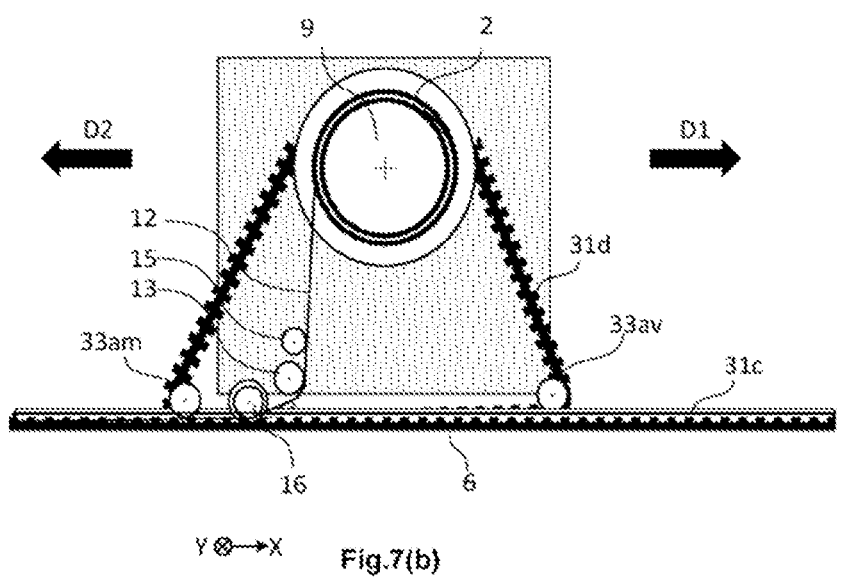

A deflection pulley (13), illustrated in FIGS. 7(a) and 7(b) and provided on each side of the surface to be covered, makes it possible to guide and position the protruding elements (12) of the longitudinal edges of the cover relative to the opening (14) of the corresponding rail (6) during the translation in the first direction of the drum bringing about the unwinding of the cover.

The cover may be made of any material suitable for the application in question: synthetic or natural textile materials, polymeric films, slats made of polymer, metal or wood, etc. The cover may be transparent, opaque or translucent and may form a barrier to fluids or conversely may be porous, or even comprise mesh such as in a net. For example, for applications in swimming pools or water treatment pools, or the like, it is advantageous if the cover comprises drainage holes, thus not allowing the rain water to accumulate on the cover and thus avoiding the formation of pockets of water on the surface of the cover.

The device comprises a system for the continuous insertion (16) of the protruding element (12) of the longitudinal edges of the cover (10) through the opening (14) and into the space (14e) of said rails (6). The insertion system (16) may be formed by one or more rollers and pulleys capable of turning about an axis of rotation and able to have different profiles in section parallel to their axis of rotation. This insertion system permits the insertion of the protruding element in the groove through the opening (14) and into the space (14e) and, by the configuration of the groove and the protruding element (12), this protruding element remains locked in the groove as the cover (10) is unwound. During the translation of the drum in the second direction, the protruding element of the cover is released from the groove, either simply by the tensile force applied by the winding of the cover around the drum or with the participation of the insertion system which permits the protruding element of the cover to be released from the groove as the cover is wound around the drum.

As discussed in the section Technological Background, the protruding element (12) defines a convex geometry in a section perpendicular to each longitudinal edge of the cover, thus forming a convex bead. This provides a great level of freedom in the choice of the mechanical properties of the protruding element, typically in flexion and compression, whilst permitting a fixing of the protruding element to the corresponding longitudinal edge of the cover, which is simple, robust and reproducible. As a reminder, a convex bead is a bead of which the section perpendicular to the longitudinal edge of the cover has a planar geometry defined by a closed perimeter which any straight line may not pass through more than twice. According to its rigidity in compression, a bead may be convex at rest, i.e. when it is not subjected to any stress, and may lose its convexity if it is subjected to sufficient stress. Such beads form part of the present invention since they are convex at rest.

The protruding element or convex bead (12) of each longitudinal edge and the groove of the corresponding rail are configured such that, once inserted into the space (14e) by the insertion system (16), the protruding element occupying the space (14e) alone cannot be removed solely by the action of a force (F) applied parallel to the transverse axis (Y) in the direction of the surface to be covered, thus forming an autonomous locking. An autonomous locking is a locking not requiring the insertion of an element other than the protruding element in, or in the vicinity of, the groove, such as the flexible belts disclosed in WO2010054960 and WO2014064138 or a grille portion disclosed in FR2803769. In order to permit such an autonomous locking of such a convex bead, the protruding element (convex bead) (12) and the groove have to respect certain criteria.

As illustrated in FIGS. 2(a)-2(d), 3(a)-3(c), 4(a)-4(d), 5(a)-5(c) and 6(a)-6(d) in a cross section perpendicular to the longitudinal axis (X), the opening (14) of the groove has a maximum width (Lo) and the space (14e) has a maximum width (Le) greater than the maximum width (Lo) of the opening (14) (Lo<Le), where the maximum widths (Lo, Le) are measured parallel to the transverse axis (Y). Preferably, the space (14e) extends beyond the opening in a direction parallel to the transverse axis (Y), forming a flange on the side opposing the surface (3) to be covered. Alternatively or additionally, it is also preferred if the space (14e) extends beyond the opening in a direction parallel to the transverse axis (Y), forming a flange on the side adjacent to the surface to be covered (3). If the groove only comprises a single flange on the side opposing, or adjacent to, the surface to be covered, the groove forms an "L-shape" in section, or mirror orientations according to whether the flange is on the opposing side or adjacent to the surface. If the groove comprises a flange on each side of the opening (14) the groove forms a reverse "T-shape" in section.

Different variant embodiments of the present invention are presented hereinafter. The variants are presented in two categories. In a first category, the maximum width (Lo) of the opening (14) remains constant during the insertion of the protruding element (12). In a second category, the maximum width (Lo) of the opening (14) varies during the insertion of the protruding element (12).

Variants in which Lo=Constant During the Insertion of the Protruding Element (12)

Elongated Protruding Element

In a first variant illustrated in FIGS. 2(a) to 2(d) and 3(a) to 3(c) the protruding element has, in section perpendicular to the longitudinal edge of the cover, an elongated geometry with a minimum diameter (d) less than or equal to the maximum width (Lo) of the opening (14) and a maximum diameter (D) greater than the maximum width (Lo) of the opening (14) (d<Lo<D). The insertion system (16) is configured to orientate the protruding element (12) through the opening (14) of the corresponding rail, having a diameter of between d and D and less than or equal to Lo. For example, as illustrated in FIG. 2(b), the insertion system may comprise an insertion roller mounted in rotation about an axis parallel to the transverse axis (Y) on a carriage (21) supporting the drum. The insertion roller (16) is positioned in the axis of the groove, adjacent to or even partially penetrating into the opening (14) of the groove, and is displaced with the carriage (21). The insertion roller (16) bears against the protruding element (12) of the cover and forces it to penetrate into the opening (14). By the combined action of the insertion roller (16) and the lip of the opening (14) adjacent to the surface to be covered, the protruding element (12) pivots, having a section, which faces the opening, of a diameter of less than or equal to the maximum width (Lo) of the opening (14). The protruding element thus may be engaged in the space (14e) of the groove and may be disengaged from contact with the lip adjacent to the surface to be covered. Once the protruding element is located in the space (14e), it may then change orientation by the action of the tension parallel to the transverse axis (Y) applied by the weight and/or the tension applied to the cover (10). The protruding element thus installed in the space (14e) of the groove, facing the opening, has a section having a diameter greater than the minimum width (Lo) of the opening, and thus cannot be removed from the groove solely by the action of the force (F) applied parallel to the transverse axis (Y) in the direction of the surface to be covered. This is illustrated in FIGS. 2(c) and 2(d).

In the variant shown in FIG. 3, the insertion system comprises an insertion roller as disclosed relative to FIGS. 2(a) to 2(d), in addition to an orientation pulley (16a) illustrated in FIG. 3(b), the inner surface of the cover bearing thereagainst. The combined actions of the insertion roller (16) and the orientation pulley (16) make it possible to provide an accurate desired orientation to the protruding element, without it having to rely on the action of the lip adjacent to the surface to be covered of the opening. The orientation pulley (16a) is also fixed in terms of rotation to the carriage and displaced therewith. The axis of rotation of the pulley (16a) is preferably perpendicular to the longitudinal axis (X) in order to permit the pulley to "roll" on the inner surface of the cover when the carriage is displaced and thus limit the wear of the cover by friction. The axis of rotation is also preferably transverse to the transverse axis (Y).

During the translation of the carriage in the first direction, in order to deploy the cover on the surface (3), the insertion system comprising the insertion roller (16) and optionally the orientation pulley (16a) enables the protruding element to be introduced into the space of the groove, suitably orientating the protruding element relative to the opening (14) and locking it therein. During the translation of the carriage in the second direction, in order to retrieve the cover and remove it from the surface, the same insertion system enables the reorientation of the protruding element such that it is able to be removed via the opening (14).

This variant based on the length/width ratio (D/d) of the protruding element (12) is simple to implement and makes it possible to lock the longitudinal edges of the cover in the groove of the corresponding rails (6) in a reversible and reproducible manner. The absence of mobile elements (apart from the rotating pulleys) increases the durability of the locking system.

Compressible Protruding Element

Figures 4A, 4B, 4C:
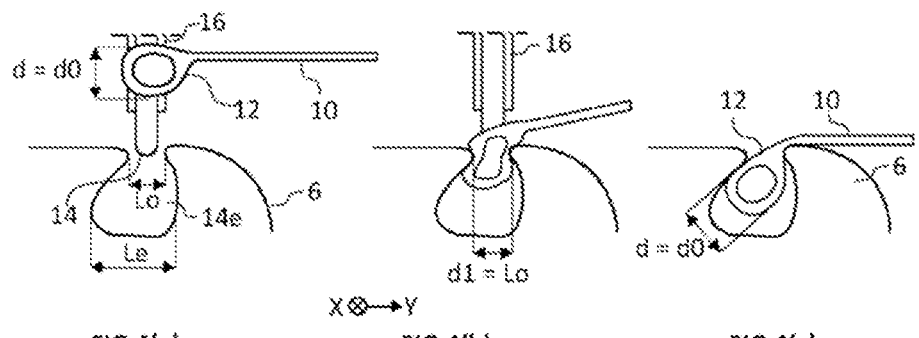
FIG. 4 (a) to (c) views of the steps of insertion and locking of the protruding element in the groove of a rail according to a second variant of the invention and (d) view in perspective of the protruding element locked in the groove of the rail with a drive belt housed in a different groove.

In a second variant illustrated in FIG. 4, the protruding element of each longitudinal edge is compressible such that it may pass from a resting configuration to a compressed configuration. As illustrated in FIG. 4(a), in the resting configuration the minimum diameter (d) of the protruding element is equal to d0 which is between the maximum widths (Lo, Le) of the opening (14) and the space (14e) of the corresponding rail (Lo<d0<Le). As illustrated in FIG. 4(b), in its resting configuration the protruding element (12) thus may not pass through the opening (14). In the compressed configuration, the minimum diameter (d) of the protruding element is equal to d1 which is less than or equal to the maximum width (Lo) of the opening (14) of the corresponding rail (d1≤Lo). The protruding element thus may pass through the opening in its compressed configuration.

Figure 4D:
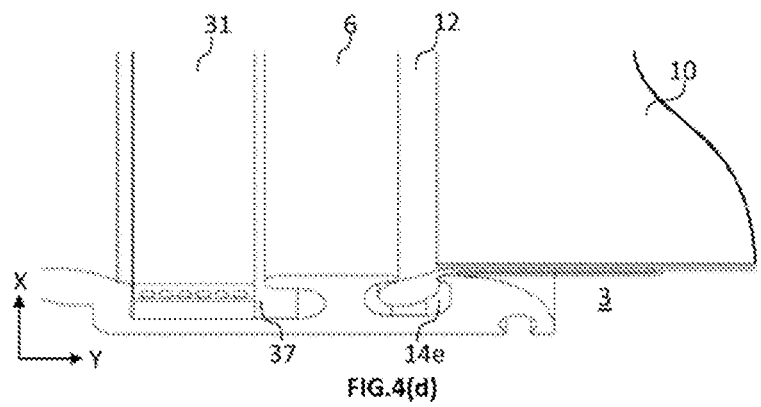

The insertion system makes it possible to compress the protruding element (12) in its compressed configuration when it is inserted through the opening (14) of the corresponding rail (6). As illustrated in FIGS. 4(a) and 4(b) and as discussed relative to the variant illustrated in FIG. 2, the insertion system may comprise an insertion roller mounted in rotation about an axis parallel to the transverse axis (Y) on the carriage (21) supporting the drum. The insertion roller (16) is positioned in the axis of the groove, adjacent to or even partially penetrating into the opening (14) of the groove, and is displaced with the carriage (21). The insertion roller (16) bears against the protruding element (12) of the cover and forces it to penetrate into the opening (14). The protruding element is compressed by the combined action of the insertion roller which presses the protruding element against the opening of the rail, and the width (Lo) of the opening of the rail which is insufficient to permit a protruding element of the diameter (d0>Lo) to pass. The diameter thereof is reduced until it is sufficiently small to pass into the opening (14) when d1=Lo as illustrated in FIG. 4(b). Once the protruding element is in the space (14e) it recovers its resting configuration by resilience. The longitudinal edge of the cover is thus locked in the groove of the rail, as illustrated in FIGS. 4(c) and 4(d). A flexible belt (31) used for the translation of the carriage is also illustrated in FIG. 4(d) and is discussed below.

The protruding element (12) may be removed from the space of the groove through the opening (14) by deforming it by traction applied to the cover to remove it from the groove. By encountering the resistance provided by the opening of maximum width (Lo) for the passage of sections of the protruding element having a diameter greater than Lo, the protruding element is compressed until the diameter (d1) of said section is at most equal to Lo and thus may pass through the opening (14). The removal of the protruding element from the groove by compression may be facilitated by providing the protruding element with a flared geometry at its point of attachment to the cover, as illustrated in FIG. 4.

The compressible protruding element (12) forms a convex bead which may be monolithic and solid or, as shown in FIG. 4, may have a core surrounded by a casing. The core may be empty or filled with a material different from that of the casing. The casing may be formed by an extruded polymer, preferably an elastomer. Alternatively, the casing may be in the form of a fabric. In this case, the core is preferably not empty but comprises an elastomer or compressible foam.

As in the variant illustrated in FIGS. 2 and 3, the present variant does not comprise any mobile parts and is simple to produce. It makes it possible to lock the longitudinal edges of the cover in the groove of the corresponding rails (6) in a reversible and reproducible manner. It is necessary to be aware of the development of wear of the compressible protruding element in the case of multiple repeated uses.

Helical Spring

Figures 5A, 5B, 5C:
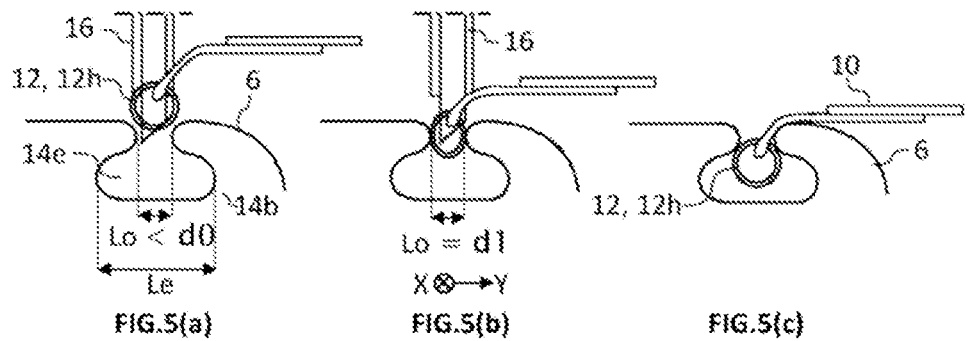
FIG. 5 (a) views of the steps of insertion and locking of the protruding element in the groove of a rail according to a third variant of the invention, (b) view from above of the deformation of the helical spring, and (c) lateral view of the protruding element during its insertion in the groove of the rail.
Figure 5D:
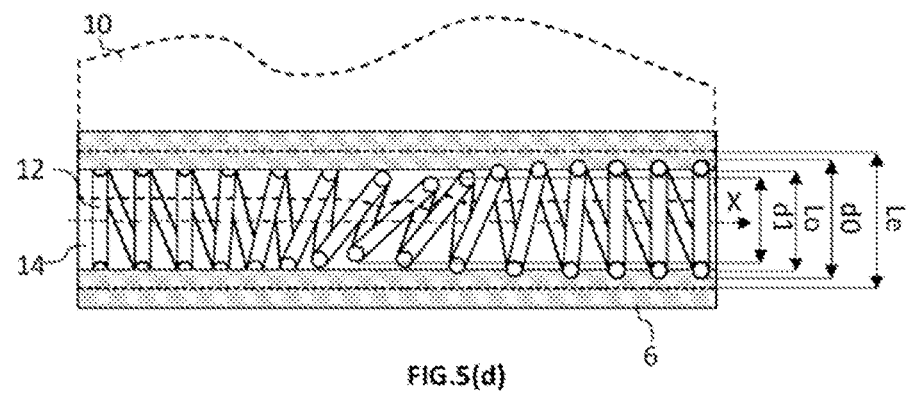

In a third variant illustrated in FIG. 5, the protruding element of each longitudinal edge is a cable in the form of consecutive turns forming a helical spring, the axis thereof being parallel to the corresponding longitudinal edge of cover (10). The turns may pass from a resting configuration to a deformed configuration. As illustrated in FIGS. 5(a), 5(c) and 5(d), in the resting configuration the minimum diameter (d) measured parallel to the transverse axis (Y) of each turn at rest is equal to d0 which is between the maximum widths (Lo, Le) of the opening (14) of the space (14e) of the corresponding rail (Lo<d0<Le). In its resting configuration, a turn of the protruding element may not pass through the opening of the groove.

As illustrated in FIGS. 5(b) and 5(d), in the deformed configuration, the angle formed by the deformed turns with the longitudinal axis (X) is changed such that the minimum diameter (d1) measured in a plane perpendicular to the longitudinal axis (X) of each deformed turn is less than or equal to the maximum width (Lo) of the opening (14) of the corresponding rail (d1≤Lo). This is illustrated by the view from above of FIG. 5(d), showing the central turns which are deformed by changing their orientation, such that the projection of the turns, which are thus deformed, on a plane perpendicular to the longitudinal axis (X) has a minimum diameter (d1) less than or equal to the width (Lo) of the opening of the rail. The turns in their deformed configuration thus may penetrate through the opening (14) of the groove.

Figure 5E:
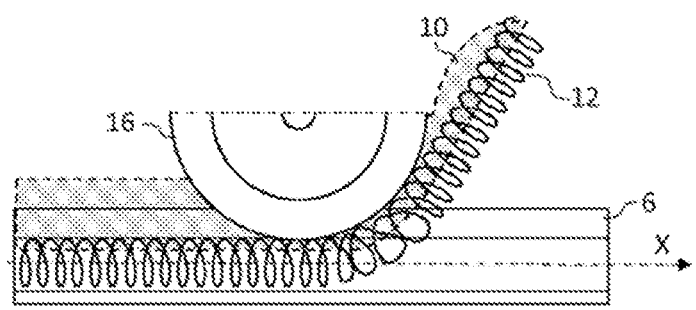

The insertion system makes it possible to deform locally the turns in their deformed configuration during their insertion through the opening (14) of the corresponding rail (6). The insertion system may comprise an insertion roller (16) which, as in the variants illustrated in FIGS. 2 to 4, may be mounted in rotation about an axis parallel to the transverse axis (Y) on the carriage (21) supporting the drum. The insertion roller (16) is positioned in the axis of the groove, adjacent to or even partially penetrating into the opening (14) of the groove, and is displaced with the carriage (21). The insertion roller (16) bears against the turns of the protruding element (12) of the cover by deforming them into their deformed configuration and forcing them to penetrate into the opening (14). Whilst the insertion rollers, discussed relative to the variants illustrated in FIGS. 2 to 4, preferably form a convex rounded edge in order to limit the wear of the protruding element of the cover on which it bears, in order to change the orientation of the turns until they reach the deformed configuration of the present variant, the insertion roller (16) preferably has a beveled edge as illustrated in FIGS. 5(a) and 5(b). The pointed section formed by the beveled edge of the insertion roller penetrates between the turns and deforms them by turning them on an axis perpendicular to the plane (X, Y). As illustrated in FIG. 5(d), the turns thus deformed may enter the space (14e) of the groove via the opening (14). FIG. 5(e) shows a lateral view of the introduction of the helical spring turn-by-turn in the groove of a rail (6).

Once they are located in the space (14e), the turns recover their resting configuration and the corresponding minimum diameter (d0), which does not permit the passage of the turns through the opening (14). The longitudinal edges of the cover are thus locked in the corresponding rails.

The unlocking is carried out in the same manner. During its translation in the second direction to return the cover to the drum, the insertion roller (16) penetrates between the turns housed in the space (14e) and pivots them into the deformed configuration. The traction applied to the cover by the rotating drum is sufficient to remove the deformed turns from the groove and thus progressively free the longitudinal edges of the cover from the corresponding rails.

The cable in the form of consecutive turns forming a helical spring may be made of different materials. For example, the cable may be made of metal, such as stainless steel, or an aluminum alloy. The metal and, in particular, the steel is preferably hardened or in any case sufficiently rigid so as not to be plastically deformed at the slightest stress, by walking thereupon or the like. Once plastically deformed, the turns may no longer be used to lock the longitudinal edges of the cover in a suitable manner. The cable may be made of polymer or polymer reinforced with reinforcing fibers, such as glass fibers, carbon fibers, natural fibers or aramid fibers (e.g. Kevlar®, Twaron®).

It is common to the above variants that the maximum width (Lo) of the opening (14) does not vary during the locking and unlocking of the protruding elements (12). The present invention may also be implemented by permitting the width Lo of the opening (14) to be varied during the insertion and removal of the protruding element (12).

Variants in which Lo Varies During the Insertion of the Protruding Element (12)

FIGS. 6(a) to 6(d) illustrate different variants, which have in common that the maximum width (Lo) of the opening (14) may vary between a resting configuration in which the maximum width (Lo) of the opening is equal to Lo0 which is less than the minimum diameter (d) of the protruding element (12) (Lo0<d), and an insertion configuration in which the maximum width (Lo) of the opening is equal to Lo1 which is greater than or equal to the minimum diameter (d) of the protruding element (12) (d Lo1).

The insertion system (16) of these variants is configured to apply a force, making it possible to bring the opening (14) into its insertion configuration when the protruding element is in the opening (14) during the insertion and removal of the protruding element (12) through the opening (14) of the corresponding rail (6). The opening (14) returns to its resting configuration once the protruding element is located outside the opening, either in the space (14e) when inserted into the groove or outside the rail when removed from the groove.

Flexible Thin Strips

In a first variant illustrated in FIG. 6(a), the opening (14) comprises a first lip opposing a second lip. The first lip and/or second lip are/is provided with a flexible thin strip (14L) orientated toward the other opposing lip. The thin strip(s) at rest at least partially close(s) the opening, defining the opening of maximum width (Lo0) of the resting configuration. When the thin strip(s) are/is subjected to a transverse force, preferably perpendicular to the plane (X, Y) orientated toward or out of the space (14e), the thin strip(s) flex(es) and thus define(s) the opening of maximum width (Lo1) of the insertion configuration.

The thin strips are preferably made of an elastomer, having sufficient rigidity to maintain the resting configuration during the application of stresses below a predefined limit, and being sufficiently flexible to flex when the stress applied is above this predefined limit. The thin strips have to be resilient or elastic in order to recover their resting configuration when the stress passes below the predefined limit again. The illustration to the left of FIG. 6(a) shows a rail in section perpendicular to the longitudinal axis (X), comprising a groove. An insertion roller (16) may be seen in the background. Each lip defining the opening (14) is provided with a thin strip extending toward the opposing lip. The free edges of the two thin strips touch one another, defining an opening width (Lo0) at rest of 0. It is clear that the strips do not necessarily have to touch one another and the opening width at rest (Lo0) may be greater than zero but less than the minimum diameter (d) of the protruding element (12). The thin strips may also be superposed, each partially extending further than half of the distance separating the two lips (0<Lo0<d). Here again a width Lo0=0 might be obtained. A distance Lo0=0 has the advantage of closing the groove when the space (14e), thus considerably reducing the accumulation of dust and dirt in the bottom of the groove.

As in the preceding variants illustrated in FIGS. 2 to 5, the insertion system may comprise an insertion roller mounted in rotation about an axis parallel to the transverse axis (Y) on the carriage (21) supporting the drum. The insertion roller (16) is positioned in the axis of the groove, adjacent to or even partially penetrating into the opening (14) of the groove, and is displaced with the carriage (21). The insertion roller (16) bears against the protruding element (12) of the cover and forces it to penetrate into the opening (14). Whilst the carriage advances in the first direction of deployment of the cover on the surface, the insertion roller applies a force perpendicular to the plane (X, Y) on the protruding element (12) which forces the deformation of the thin strips which pass from their resting configuration to the insertion configuration by flexing and increasing the maximum width of the opening Lo1=d. The protruding element may then penetrate through the opening and may be housed in the space (14e) (see illustrations at the middle and right of FIG. 6(a)).

The removal of the protruding element from the groove of the rail is carried out by traction of the cover brought about by the winding thereof around the drum, which forces the deformation of the thin strips until they reach their insertion configuration, permitting the passage of the protruding element through the opening (14).

Flexible Rolls 1

FIG. 6(b) illustrates a second variant in which the opening (14) comprises a first lip opposing a second lip, the first and/or second lip being provided with a flexible roll (14b). The flexible roll(s) (14b) define(s) at rest the opening of maximum width (Lo0) of the resting configuration. The flexible roll(s) (14b) is/are deformed and crushed when they are subjected to a force perpendicular to the plane (X, Y) and thus define the opening of maximum width (Lo1) of the insertion configuration.

As in the variant of FIG. 6(a) discussed above, the insertion system may comprise an insertion roller mounted in rotation about an axis parallel to the transverse axis (Y) on the carriage (21) supporting the drum. The insertion roller (16) is positioned in the axis of the groove, adjacent to or even partially penetrating into the opening (14) of the groove, and is displaced with the carriage (21). The insertion roller (16) bears against the protruding element (12) of the cover and forces it to penetrate into the opening (14). Whilst the carriage advances in the first direction of deployment of the cover on the surface, the insertion roller applies a force perpendicular to the plane (X, Y) on the protruding element (12) which forces the deformation of the flexible roll(s) (14b) which pass(es) from the resting configuration to the insertion configuration by being crushed and thus increasing the maximum width of the opening Lo1=d. The protruding element may then penetrate through the opening and may be housed in the space (14e) (see illustrations at the middle and right of FIG. 6(b)).

The removal of the protruding element from the groove of the rail is carried out by traction of the cover brought about by the winding thereof around the drum, which forces the deformation of the flexible roll(s) (14b) until the insertion configuration thereof is reached, permitting the passage of the protruding element through the opening (14).

Flexible Rolls 2

FIG. 6(c) illustrates a third variant in which the space (14e) contains a flexible roll (14b), the flexible roll (14b) at rest partially obstructing the opening, thus defining the maximum width (Lo0) of the resting configuration. The flexible roll (14b) is deformed and crushed when it is subjected to a force perpendicular to the plane (X, Y) and thus defines the opening of maximum width (Lo1) of the insertion configuration.

As in the variant of FIG. 6(b) discussed above, the insertion system may comprise an insertion roller mounted in rotation about an axis parallel to the transverse axis (Y) on the carriage (21) supporting the drum. The insertion roller (16) is positioned in the axis of the groove, adjacent to or even partially penetrating into the opening (14) of the groove, and is displaced with the carriage (21). The insertion roller (16) bears against the protruding element (12) of the cover and forces it to penetrate into the opening (14). Whilst the carriage advances in the first direction of deployment of the cover on the surface, the insertion roller applies a force perpendicular to the plane (X, Y) on the protruding element (12) which forces the deformation of the flexible rolls (14b)

which pass from the resting configuration to the insertion configuration by being crushed and thus increasing the maximum width of the opening Lo1=d. The protruding element may then penetrate through the opening and may be housed in the space (14e) (see illustrations at the middle and right of FIG. 6(c)).

The removal of the protruding element from the groove of the rail is carried out by traction of the cover brought about by the winding thereof around the drum, which forces the deformation of the flexible roll (14b) until it reaches the insertion configuration, permitting the passage of the protruding element through the opening (14).

The flexible rolls (14b) of the variants illustrated in FIGS. 6(b) and 6(c) preferably are in the form of hollow tubes or comprise a core made of compressible material such as a synthetic foam. The flexible rolls are preferably extruded from an elastomer material.

Brushes with Flexible Bristles

FIG. 6(d) illustrates a fourth variant in which the opening (14) comprises a first lip opposing a second lip. The first and/or second lip are provided with a brush comprising bristles extending toward the opposing lip and partially or completely closing the opening (14), said bristles being sufficiently flexible to flex and thus permit the introduction of the protruding element (12) through the opening (14).

The brushes are preferably made of polymer, the bristles having sufficient rigidity to maintain the resting configuration during the application of stresses below a predefined limit and sufficiently flexible to flex when the stress applied is above this predefined limit. The bristles have to be resilient or elastic in order to recover their resting configuration when the stress passes below the predefined limit again.

As in the preceding variants illustrated in FIGS. 6(a) to 6(c), the insertion system may comprise an insertion roller mounted in rotation about an axis parallel to the transverse axis (Y) on the carriage (21) supporting the drum. The insertion roller (16) is positioned in the axis of the groove, adjacent to or even partially penetrating into the opening (14) of the groove, and is displaced with the carriage (21). The insertion roller (16) bears against the protruding element (12) of the cover and forces it to penetrate into the opening (14). Whilst the carriage advances in the first direction of deployment of the cover on the surface, the insertion roller applies a force perpendicular to the plane (X, Y) on the protruding element (12) which forces the deformation of the bristles of the brushes which pass from their resting configuration to the insertion configuration by flexing and increasing the maximum width of the opening Lo1=d. The protruding element may then penetrate through the opening and may be housed in the space (14e) (see illustrations at the middle and right of FIG. 6(a)).

The removal of the protruding element from the groove of the rail is carried out by traction of the cover brought about by the winding thereof around the drum, which forces the deformation of the bristles of the brushes until they reach their insertion configuration, permitting the passage of the protruding element through the opening (14).

Guidance of Protruding Elements Toward the Opening

The guidance of the protruding elements into the opening is made possible by the substantially cylindrical deflection pulley (13) mounted in rotation along an axis parallel to the transverse direction of the cover on each side of the drum. FIGS. 7(a) and 7(b) show an example of a deflection pulley (13), formed by a pulley mounted on an axis parallel to the axis of the drum and the transverse axis (Y). The cover (10) partially surrounds the deflection pulley which pushes the protruding element by moving it away from the surface to be covered in order to keep it perpendicular to the opening (14) of the corresponding rails, in alignment with the insertion system (16). As the diameter of the drum varies during its translation movements according to the amount of cover which it supports, the device may comprise an alignment pulley (15) which ensures that the longitudinal edge of the cover and its protruding element (12) always reach the deflection pulley (13) at the same angle, whatever the position of the carriage relative to the longitudinal axis (X).

Displacement Mechanism

As illustrated in FIGS. 1(a) and 1(b) and 7(a) and 7(b) the displacement mechanism preferably comprises a carriage (21) mounted on the rails (6) and transversely overhanging the surface (3) to be covered and supporting the drum (2), comprising at each of its ends:

a drive wheel (9), the axis of rotation thereof being parallel to that of the drum (2);

at least one downstream roller (33av) and one upstream roller (33am) resting on the rails (6) or on a surface adjacent to the rails, and permitting the longitudinal translation of the carriage (21). The upstream roller (33av) is mounted downstream of the drive wheel and the upstream roller (33am) is mounted upstream of the drive wheel (9) in the first direction of displacement and forming therewith a preferably substantially isosceles triangle of which the drive wheel (9) forms an apex.

The terms "upstream" and "downstream" are used relative to the displacement of the drum in the first direction, permitting the deployment of the cover on the surface. The surface portion located upstream of the drum is already covered by the cover, whilst the surface portion located downstream of the drum is not yet covered. The upstream and downstream rollers (33am, 33av) rest on the rails (6) but are preferably separated from, and do not roll on, the opening (14) of the grooves. Preferably, the upstream and downstream rollers (33am, 33av) rest adjacent to the opening (14) of the grooves, said grooves separating the upstream and downstream rollers from the surface to be covered (3).

The displacement of the drum along a surface to be covered or uncovered is generally produced at a constant speed. The drive wheels (9) thus have to turn at a substantially constant rotational speed. However, primarily for surfaces of significant longitudinal dimensions, the external diameters of the drum may vary considerably when the cover is deployed or removed. As the speed of deployment/removal of the cover depends on the speed of rotation of the drive wheels (which remains generally constant) and as the external diameter of the drum varies with the portion of the cover which is wound thereon, it follows that the drum and the drive wheels (9) may not turn at the same speed. For covers of small dimensions, it is possible to compensate for differences in speed by traction on the cover. For covers of greater longitudinal dimensions, such as for a swimming pool or a trailer of a semi-trailer, it is necessary to provide means of changing the relative speed of rotation between the drum for winding up/unwinding the cover and the axis of rotation of the drive wheels (9). These means may include a spiral spring placed inside the drum (2) making it possible to compensate for the difference between the speed of rotation of the drive wheels, which has to remain substantially constant, and the speed of rotation of the drum which varies with the external diameter of the drum as the cover is wound up/unwound. As described above, during the deployment of the cover, the drum spontaneously turns due to the tension created by the cover which is fixed to the upstream transverse end of the surface to be covered. If the spiral spring becomes tensioned during the deployment of the cover (10) on the surface, it is no longer necessary to motorize the rotation of the drum during the collection and rewinding of the cover around the drum, the rotation thereof being brought about by the relaxation of the spiral spring. This system is very advantageous since it does not require a second motor or a system of gears or an electronic controller to turn the drum at the appropriate speed.

In a preferred variant of the translation mechanism illustrated in FIGS. 1(a) and 7(a), the translation mechanism comprises two flexible belts (31) solely fixed at each of their ends (35) to the four corners of the surface to be covered, each of the two belts (31):
- the two belts are arranged in a channel (37) which is preferably defined in the rails (6), extending separately and parallel to the corresponding groove in the lateral sections (31a) between a fixing point (35) and the roller (33av, 33am) closest to said fixing point (see FIG. 4(d)),
- the two belts cover the drive wheel (9) in the central section (31b) between the two rollers (33av, 33am) without slipping.

The belt portions introduced into the lateral section (31a) located upstream of the upstream roller (33am), i.e. between the upstream roller and the transverse upstream end of the surface, are preferably introduced into a channel (37) which extends parallel to the longitudinal axis (X) and to the groove of the corresponding rail (6) and which is separated from the surface to be covered by the groove. It is naturally possible to have a pair of rails (6) to lock the longitudinal edges of the cover, and a pair of separate rails to guide the carriage in its translation movements, but it is no longer practical to combine these two functions in the same pair of rails (6), which have a profile comprising a groove, a surface to support and guide the upstream and downstream rollers (33am, 33av) and, if required, a channel to receive the flexible belts.

This system of flexible belts makes it possible to displace the carriage along the rails in a more reproducible manner than a toothed wheel rolling on a straight rack extending along the longitudinal axis (X). As the angular segment of the drive wheel (9) covered by a flexible belt (31) as described above is significantly greater than that covered by a straight rack, for example placed at the bottom of the rail, the risks of a drive wheel slipping are considerably reduced. Such a slipping of a drive wheel might cause the carriage to be misaligned and the blockage of the system. A second advantage of such a system is that, between the carriage and the corners (35) of the surface to be covered, the channel is sealed by the belt (31) which is inserted into the rail in its two sections (31a) upstream and downstream of the drum. This makes it possible to reduce the ingress of foreign bodies into the rails, such as dust, gravel, twigs, etc. and also to prevent a person trapping a toe therein, for example in the case of a swimming pool.

In an alternative variant of the translation mechanism illustrated in FIGS. 1(b), 1(c) and 7(b), the translation mechanism comprises the following elements. Two belts (31d) which are flexible and closed (i.e. forming a loop) surround the upstream and downstream rollers (33am, 33av) and the drive wheel (9) at the two ends of the drum, without slipping. Each flexible belt comprises an inner face and an outer face separated from the inner face by a thickness of the belts, the outer face of each flexible belt being notched and the inner face of each flexible belt being either notched or textured. The inner surface of each flexible belt covers the upstream and downstream rollers (33am, 33av) and the drive wheel (9), without slipping.

Two racks (31c) are arranged along the longitudinal edges, parallel to and separate from the opening (14) of each rail (6). The notched external surface of a portion of each of the flexible belts between the corresponding upstream roller (33av) and downstream roller (33am) meshes in the corresponding rack. The rotation of the drive wheels brings about the rotation of the flexible belts, thus displacing the drum which meshes in the racks which are fixed. The drive wheels could also be brought into direct contact with the racks, but the contact surface area between the gear of the drive wheels with the racks is much smaller than with the solution of the flexible belts described above, thus avoiding the slipping which would make the drum misaligned relative to the rails and would block the functioning of the device.

A covering device according to the present invention is particularly suitable for covering surfaces such as:
(a) a pool which is filled or not filled with a liquid such as a swimming pool, jacuzzi, a pool for the retention, treatment or desalination of water;
(b) a sports ground such as a tennis court or cricket pitch;
(c) a vehicle body, such as a semi-trailer;
(d) a glazed surface such as a greenhouse, a conservatory or a vehicle window,
(e) an opening in a wall, such as for example a door or a window.

With the device according to the present invention, a surface (3) may be covered by a cover (10) very simply in the following manner:
(a) the drum (2) is located at an upstream end of the surface to be covered, with a transverse edge of the cover being fixed to this upstream end of the surface and the remainder of the cover being wound around the drum,
(b) advancing the drum in a first direction over the surface to be covered along the rails (6) and thus unwinding from the drum the cover which is deployed over the surface portion upstream of the drum and, at the same time, guiding and holding the protruding element (12) of each longitudinal edge of the cover relative to the opening (14) of the corresponding rail (6) as the drum advances,
(c) introducing the protruding element into the space (14e) of the rail and thus locking the protruding element to the rail.

In a device for covering as described above, the longitudinal edges of the cover are tightly locked, thus providing increased safety, above all in the case of pools, whether filled or not with water or another liquid. This also makes it possible to achieve a significant degree of sealing between the volume defined below the cover and the volume defined above the cover. This makes it possible, again in the case of pools, to limit significantly the evaporation of water and chemical products, such as chlorine. This also makes it possible to pressurize the volume defined below the cover. In order to implement this locking of the longitudinal edges of the cover, protruding elements (12) forming convex beads are used. Such convex beads are much easier to couple to the longitudinal edges of a cover than extruded profiles having complex geometries. The locking system of the device of the present invention does not require the synchronization of the introduction of the bead with a third element, such as a flexible belt as disclosed in WO2010054960 and WO2014064138 or a grille portion as disclosed in FR2803769, which is advantageous for the simplicity of the system and its reproducibility and longevity.

| | Feature | |
|---|---|---|
| 1 | Device for covering a surface | |
| 2 | Drum | |
| 3 | Surface to be covered | |
| 6 | Rail | |
| 9 | Drive wheel | |
| 10 | Cover | |
| 12 | Protruding element | |
| 14 | Rail opening | |
| 14b | Flexible roll | |
| 14e | Rail space | |
| 15 | Alignment pulley | |
| 16 | Insertion system/insertion roller | |
| 16a | Orientation pulley | |
| 21 | Carriage | |
| 30 | Motor | |
| 31 | Flexible belt | |
| 31a | Lateral section of flexible belt | |
| 31b | Central section of flexible belt | |
| 31c | Rack | |
| 31d | Closed flexible belt | |
| 33am | Upstream roller of carriage | |
| 33av | Downstream roller of carriage | |
| 35 | Ends of flexible belts 31 | |
| 37 | Insertion channel for flexible belts | |
| d | Minimum diameter of protruding element (measured perpendicularly to longitudinal edge) | |
| d0 | Minimum diameter of protruding element in resting configuration (measured perpendicularly to longitudinal edge) | |
| d1 | Minimum diameter of protruding element in non-resting configuration (measured perpendicularly to longitudinal edge) | |
| D | Maximum diameter of protruding element | |
| F | Force applied parallel to transverse axis (Y) | |
| Le | Maximum width of space (measured parallel to Y) | |
| Lo | Minimum width of opening (measured parallel to Y) | |
| Lo0 | Minimum width of opening in resting configuration (measured parallel to Y) | |
| Lo1 | Minimum width of opening in non-resting configuration (measured parallel to Y) | |
| X | Longitudinal axis | |
| Y | Transverse axis | |
| (X, Y) | Plane (X, Y) | |

The invention claimed is:

1. A device for covering (1) a surface (3) encompassed in a rectangle, having lengths extending parallel to a longitudinal axis (X) and having widths extending parallel to a transverse axis (Y) perpendicular to the longitudinal axis (X), the device comprising:
  (a) a substantially rectangular cover (10) having dimensions equal to those of the rectangle and having first and second longitudinal edges opposing one another and first and second transverse edges opposing one another, each longitudinal edge being provided with a protruding element (12) extending along said each longitudinal edge in which the protruding element of each longitudinal edge defines a profile in section, perpendicular to the corresponding longitudinal edge, having a minimum diameter (d),
  (b) two rails (6) placed on either side of said surface (3) parallel to the longitudinal axis (X), each rail consisting of a profile having an opening (14) on one of its faces and orientated away from the surface to be covered, the opening providing access to a space (14e) in the rail, defining with the opening a groove extending along the length of each rail,
  (c) a drum (2) having a radius (R) mounted in rotation so as to be capable of winding up and unwinding the cover (10) which is fixed to the drum by its first transverse edge, said drum (2) being mounted on a mechanism for longitudinal translation, permitting the longitudinal translation of the drum along the two rails in a first direction parallel to the longitudinal axis (X) bringing about the unwinding of the cover and its deployment over the surface (3) to be covered, and in a second direction parallel to the longitudinal axis (X) bringing about the winding up of the cover and its removal from said surface (3),
  (d) a deflection pulley (13) provided on each side of the surface to be covered, making it possible to guide and position said protruding element (12) of each longitudinal edge of the cover relative to the opening (14) of the corresponding rail (6) during the translation in the first direction of the drum bringing about the unwinding of the cover,
  (e) a system (16) for the continuous insertion of the protruding element (12) of the longitudinal edges of the cover (10) through the opening (14) and into the space (14e) of said rails (6),
characterized in that
  in a section perpendicular to each longitudinal edge of the cover, the corresponding protruding element (12) defines a convex geometry, wherein a convex geometry is defined as a planar geometry defined by a closed perimeter which any straight line may not pass through more than twice,
  in a cross section perpendicular to the longitudinal axis (X), the opening (14) of the groove has a maximum width (Lo) and the space (14e) has a maximum width (Le) greater than the maximum width (Lo) of the opening (14) (Lo<Le), where the maximum widths (Lo, Le) are measured parallel to the transverse axis (Y) and in that
  the protruding element (12) of each longitudinal edge and the groove of the corresponding rail are configured such that, once inserted into the space (14e) by the insertion system, the protruding element occupying the space (14e) alone cannot be removed solely by the action of a force (F) applied parallel to the transverse axis (Y) in the direction of the surface to be covered.

2. The device as claimed in claim 1, wherein
  the minimum diameter (d) of the protruding element is less than the maximum width (Lo) of the opening (14) (d<Lo),
  the protruding element has a maximum diameter (D) greater than the maximum width (Lo) of the opening (14) (Lo<D), and wherein
  the insertion system is configured to orientate the protruding element (12) through the opening (14) of the corresponding rail, having a diameter of between d and D and less than Lo, the protruding element changing orientation once the protruding element is located in the space (14e).

3. The device as claimed in claim 1, wherein the protruding element of each longitudinal edge is compressible such that
  in a resting configuration, the minimum diameter (d) is equal to d0 which is between the maximum widths (Lo, Le) of the opening (14) and of the space (14e) of the corresponding rail (Lo<d0<Le), and
  in a compressed configuration, the minimum diameter (d1) is equal to d1 which is less than or equal to the maximum width (Lo) of the opening (14) of the corresponding rail (d1≤Lo), and in which the insertion system makes it possible to compress the protruding element (12) into its compressed configuration during its insertion through the opening (14) of the corresponding rail (6), the protruding element (12) recovering its resting configuration once the protruding element is located in the space (14e).

4. The device as claimed in claim 1, wherein the protruding element (12) of each longitudinal edge is a cable in the form of consecutive turns forming a helical spring, the axis thereof being parallel to the corresponding longitudinal edge of the cover (10), wherein the turns are defined such that in a resting configuration the minimum diameter (d), measured parallel to the transverse axis (Y) of each turn at rest, is equal to d0 which is between the maximum widths (Lo, Le) of the opening (14) and the space (14e) of the corresponding rail (Lo<d0<Le), and in a deformed configuration, the angle formed by the deformed turns with the longitudinal axis (X) is changed such that the minimum diameter (d1) measured in a plane perpendicular to the longitudinal axis (X) of each deformed turn is less than or equal to the maximum width (Lo) of the opening (14) of the corresponding rail (d1≤Lo), and wherein the insertion system makes it possible to deform locally the turns in their deformed configuration when inserted through the opening (14) of the corresponding rail (6), the turns recovering their resting configuration once they are located in the space (14e).

5. The device as claimed in claim 1, wherein the maximum width (Lo) of the opening (14) may vary between a resting configuration in which the maximum width (Lo) of the opening is equal to Lo0 which is less than the minimum diameter (d) of the protruding element (12) (Lo0<d), and an insertion configuration in which the maximum width (Lo) of the opening is equal to Lo1 which is greater than or equal to the minimum diameter (d) of the protruding element (12) (d≤Lo1), and wherein the insertion system is configured to apply a force, permitting the opening (14) to be brought into its insertion configuration during the insertion of the protruding element (12) through the opening (14) of the corresponding rail (6), the opening (14) returning to its resting configuration once the protruding element is located in the space (14e).

6. The device as claimed in claim 5, wherein the opening (14) comprises a first lip opposing a second lip, the first and/or second lip being provided with a flexible thin strip (14L) orientated toward the other opposing lip, the thin strip(s) defining at rest the opening of maximum width (Lo0) of the resting configuration and, subjected to a force perpendicular to the longitudinal axis orientated toward the space (14e), flexing and thus defining the opening of maximum width (Lo1) of the insertion configuration.

7. The device as claimed in claim 5, wherein the opening (14) comprises a first lip opposing a second lip, the first and/or second lip being provided with a flexible roll (14b), the flexible roll(s) (14b) defining at rest the opening of maximum width (Lo0) of the resting configuration and, subjected to a force perpendicular to the plane (X, Y), being crushed and thus defining the opening of maximum width (Lo1) of the insertion configuration.

8. The device as claimed in claim 5, wherein the space (14e) contains a flexible roll (14b), the flexible roll (14b) at rest partially obstructing the opening, thus defining the maximum width (Lo0) of the resting configuration and, subjected to a force perpendicular to the plane (X, Y), being crushed and thus defining the opening of maximum width (Lo1) of the insertion configuration.

9. The device as claimed in claim 5, wherein the opening (14) comprises a first lip opposing a second lip, the first and/or second lip being provided with a brush comprising bristles extending toward the opposing lip and partially or completely closing the opening (14), said bristles being sufficiently flexible to flex and thus permit the introduction of the protruding element (12) through the opening (14).

10. The device as claimed in claim 1, wherein the translation mechanism comprises a carriage (21) mounted on the rails (6) and transversely overhanging the surface (3) to be covered and supporting the drum (2), comprising at each of its ends:

a drive wheel (9), the axis of rotation thereof being parallel to said drum (2);

at least one downstream roller (33av) and one upstream roller (33am) resting on the rails (6) or on a surface adjacent to the rails, and permitting the longitudinal translation of the carriage (21), and the first roller being mounted downstream and the second roller being mounted upstream of the drive wheel (9) in the first direction of displacement and forming therewith a triangle of which the drive wheel (9) forms an apex.

11. The device as claimed in claim 10, wherein the downstream roller (33av) and the upstream roller (33am) rest on the corresponding rail (6) and wherein the translation mechanism comprises two flexible belts (31) fixed solely at each of their ends (35) to the four corners of the surface to be covered and extending along the longitudinal edges of the surface to be covered in the following manner:

the flexible belts are arranged in a channel (37) defined in the rails (6), extending separately and parallel to the corresponding groove in the lateral sections (31a) between a fixing point (35) and the roller (33av, 33am) closest to said fixing point, the flexible belts cover the drive wheel (9) in the central section (31b) between the two rollers (33av, 33am) without slipping.

12. The device as claimed in claim 10, wherein the translation mechanism comprises:

two closed flexible belts (31d) forming a loop and comprising an inner face and an outer face separated from the inner face by a thickness of the belts, the inner and outer faces of each flexible belt each being notched, the inner surface of each flexible belt covering the upstream and downstream rollers (33am, 33av) and the drive wheel (9) without slipping and two racks (31c) arranged along the longitudinal edges, separate and parallel to the opening (14) of each rail (6), the outer surface of a portion of each of the flexible belts between the corresponding downstream roller (33av) and upstream roller (33am) meshing in the corresponding rack.

13. The use of a device as claimed in claim 1 for covering at least one of a surface (3) of:

(a) a pool which is filled or not filled with a liquid selected form the group consisting of a swimming pool, jacuzzi, a pool for the retention, treatment or desalination of water;

(b) a sports ground selected form the group consisting of a tennis court or cricket pitch;

(c) a vehicle body;

(d) a glazed surface selected form the group consisting of a greenhouse, a conservatory or a window or door, or (e) an opening in a wall, selected form the group consisting of a window or a door.

14. A method for covering a surface (3) by a cover (10), using a device for covering as claimed in claim 1, wherein:
   (a) the drum (2) is located at an upstream end of the surface to be covered, with a transverse edge of the cover being fixed to this upstream end of the surface and the remainder of the cover being wound around the drum,
   (b) advancing the drum in a first direction over the surface to be covered along the rails (6) and thus unwinding from the drum the cover which is deployed on the surface portion upstream of the drum and, at the same time, guiding and holding the protruding element (12) of each longitudinal edge of the cover relative to the opening (14) of the corresponding rail (6) as the drum advances,
   (c) introducing the protruding element into the space (14*e*) of the rail and thus locking the protruding element to the rail.

* * * * *